United States Patent
Desmond

(10) Patent No.: US 9,612,384 B2
(45) Date of Patent: Apr. 4, 2017

(54) LIGHT FITTING

(71) Applicant: JCC Lighting Products Limited, Bognor Regis, West Sussex (GB)

(72) Inventor: John Desmond, Hayling Island (GB)

(73) Assignee: JCC Lighting Products Limited, West Sussex (GB)

( * ) Notice: Subject to any disclaimer, the term of this patent is extended or adjusted under 35 U.S.C. 154(b) by 154 days.

(21) Appl. No.: 14/693,003

(22) Filed: Apr. 22, 2015

(65) Prior Publication Data

US 2016/0178825 A1    Jun. 23, 2016

Related U.S. Application Data

(60) Provisional application No. 62/137,042, filed on Mar. 23, 2015.

(30) Foreign Application Priority Data

Dec. 19, 2014    (GB) .................. 1422838.1

(51) Int. Cl.
| | |
|---|---|
| *F21V 8/00* | (2006.01) |
| *F21V 7/00* | (2006.01) |
| *F21W 131/301* | (2006.01) |
| *F21Y 105/00* | (2016.01) |
| *F21Y 101/00* | (2016.01) |
| *F21Y 103/30* | (2016.01) |

(52) U.S. Cl.
CPC ............ *G02B 6/004* (2013.01); *F21V 7/0016* (2013.01); *G02B 6/002* (2013.01); *G02B 6/0083* (2013.01); *G02B 6/0085* (2013.01); *G02B 6/0095* (2013.01); *F21W 2131/301* (2013.01); *F21Y 2101/00* (2013.01); *F21Y 2103/30* (2016.08); *F21Y 2105/00* (2013.01); *G02B 6/0055* (2013.01); *G02B 6/0068* (2013.01); *G02B 6/0073* (2013.01)

(58) Field of Classification Search
CPC ............ F21V 7/0016; F21W 2131/301; F21Y 2101/00; F21Y 2103/30; F21Y 2105/00; G02B 6/002; G02B 6/004; G02B 6/0055; G02B 6/0068; G02B 6/0073; G02B 6/0083; G02B 6/0085; G02B 6/0095
See application file for complete search history.

(56) References Cited

U.S. PATENT DOCUMENTS

| | | | | |
|---|---|---|---|---|
| 6,991,359 B2 * | 1/2006 | Leu | ....................... | G02B 6/0061 362/346 |
| 7,817,887 B2 * | 10/2010 | Inditsky | ............... | G02B 6/0011 349/65 |

FOREIGN PATENT DOCUMENTS

GB    2502397 A9    11/2013

OTHER PUBLICATIONS

Combined Search and Examination Report dated Jun. 12, 2015 issued in corresponding Application No. GB1422838.1.

* cited by examiner

*Primary Examiner* — Stephen F Husar

(57) ABSTRACT

A light fitting comprises an aperture, a light guide member comprising a curved edge portion and a reflective pattern, and a light source including one or more light emitting diodes arranged with respect to the aperture and the curved edge portion of the light guide member such that a substantial part of the light emitted by the one or more light emitting diodes passes indirectly through the aperture by reflecting from the reflective pattern of the light guide member through the aperture.

20 Claims, 9 Drawing Sheets

LIGHT FITTING

CROSS-REFERENCE TO RELATED APPLICATIONS

This application claims priority to co-pending Great Britain Provisional Patent Application Ser. No. 1422838.1, filed Dec. 19, 2014, and co-pending U.S. Provisional Patent Application Ser. No. 62/137,042, filed Mar. 23, 2015, the entirety of which applications are incorporated by reference herein.

FIELD OF THE DISCLOSURE

The present invention relates to a light fitting. More particularly, embodiments of the present invention relate to light fittings including light emitting diode (LED) light sources.

BACKGROUND OF THE DISCLOSURE

Conventional incandescent and fluorescent light fittings are being replaced by more energy efficient and more environmentally friendly light emitting diode (LED) light fittings.

Conventional light fittings comprise a housing to contain the incandescent or fluorescent light source. The housing has an aperture through which light emitted by the light source is directed. One or more reflectors may be provided to direct light through the aperture. A light diffuser may be provided which covers the aperture and helps to diffuse (i.e. scatter) the light which passes therethrough.

Many LED light fittings mimic the previous conventional light fittings—as these are proven designs and are in demand.

However, LEDs emit a far narrower beam of light than conventional light sources (which might generally be considered to be omni-directional light sources). A conventional T5 fluorescent light source emitting light (e.g. light rays 12) in an omni-directional manner is shown in FIG. 9.

In addition, each LED typically emits far less light than a single conventional light source. Therefore, an array of LEDs is usually required to provide sufficient light over the required region.

However, when LEDs (or an array of LEDs) are used as the light sources in otherwise conventional light fittings, the light emitted by the LEDs is not sufficiently diffused to provide uniform or substantially uniform light emission across the aperture of the fitting. Instead, the location of each individual LED is typically identifiable as a bright spot of light.

The provision of a diffuser which diffuses the emitted light to a greater extent also reflects more light back into the fitting—so less light leaves the light fitting. This is therefore not an adequate solution to the problem.

Light guide boards (LGB) can be used in the light fitting in an attempt to provide uniform or substantially uniform light emission across the aperture of the light fitting. However adding additional components such as an LGB and/or a diffuser to a light fitting will increase the bulkiness (e.g. thickness) of the light fitting. In situations where the light fitting is intended to be hidden substantially away when installed or where the light fitting is intended to be installed in an area where space is at a premium, such as, under a cabinet or under a shelf, it is desirable to minimize the bulkiness of the light fitting.

The present invention seeks to ameliorate one or more problems associated with the prior art.

SUMMARY OF THE DISCLOSURE

Accordingly, an aspect of the present invention provides a light fitting comprising: an aperture; a light guide member comprising a curved edge portion and a reflective pattern; a light source including one or more light emitting diodes arranged with respect to the aperture and the curved edge portion of the light guide member such that a substantial part of the light emitted by the one or more light emitting diodes passes indirectly through the aperture by reflecting from the reflective pattern of the light guide member through the aperture.

The light source may include a plurality of light emitting diodes arranged in a complementary curved manner with respect to the curved edge portion of the light guide member.

The light source may include a plurality of light emitting diodes which are configured such that the substantial part of the light emitted by the diodes intersects in a first predetermined region.

The light guide member may be located in the first predetermined region.

The plurality of light emitting diodes may be configured such that the substantial part of the light emitted by the diodes focuses into the center of the light guide member.

The light guide member and the plurality of light emitting diodes may be arranged such that the substantial part of the light emitted by the diodes converges to a second predetermined region through the aperture after reflecting from the reflective pattern of the light guide member.

The reflective pattern may comprise a designed or computer generated dot matrix reflective pattern for gathering, guiding and dispersing the substantial part of the light emitted by the plurality of the light emitting diodes to the second predetermined region through the aperture.

The reflective pattern may be configured to redirect by refraction the light from the one or more light emitting diodes through the aperture.

The curved edge portion of the light guide member may be one of a convex shaped edge portion, a crescent shaped edge portion, a domed shaped edge portion, an arc shaped edge portion, and a partially ringed shaped edge portion.

In some embodiments, the light source including the one or more light emitting diodes may be arranged in a complementary shaped arrangement with respect to the curved portion of the light guide member.

The light source may include a plurality of light emitting diodes mounted on a flexible circuit board member.

The light fitting may further comprise a reflector arranged with respect to the light guide member for reflecting light received via the light guide member.

In some embodiments, one or more light emitting diodes may comprise a partial ring of light emitting diodes and the light guide member is located adjacent to the partial ring of light emitting diodes.

In some embodiments, the light emitting diodes may define an illumination plane along which the substantial part of the light emitted by the light emitting diodes passes, and wherein the light guide member intersects the illumination plane.

The light fitting may further comprise a heat sink member coupled in thermal communication with the light source.

The heat sink member may be positioned remote from the light guide member with respect to the light source.

The light source may be configured for connection to an electrical supply via a micro universal serial bus connection.

In some embodiments, the light fitting may be an under-shelf or under-cabinet light fitting.

BRIEF DESCRIPTION OF THE DRAWINGS

By way of example, a specific embodiment of the disclosed device will now be described, with reference to the accompanying drawings, in which.

DETAILED DESCRIPTION

Figure 1:
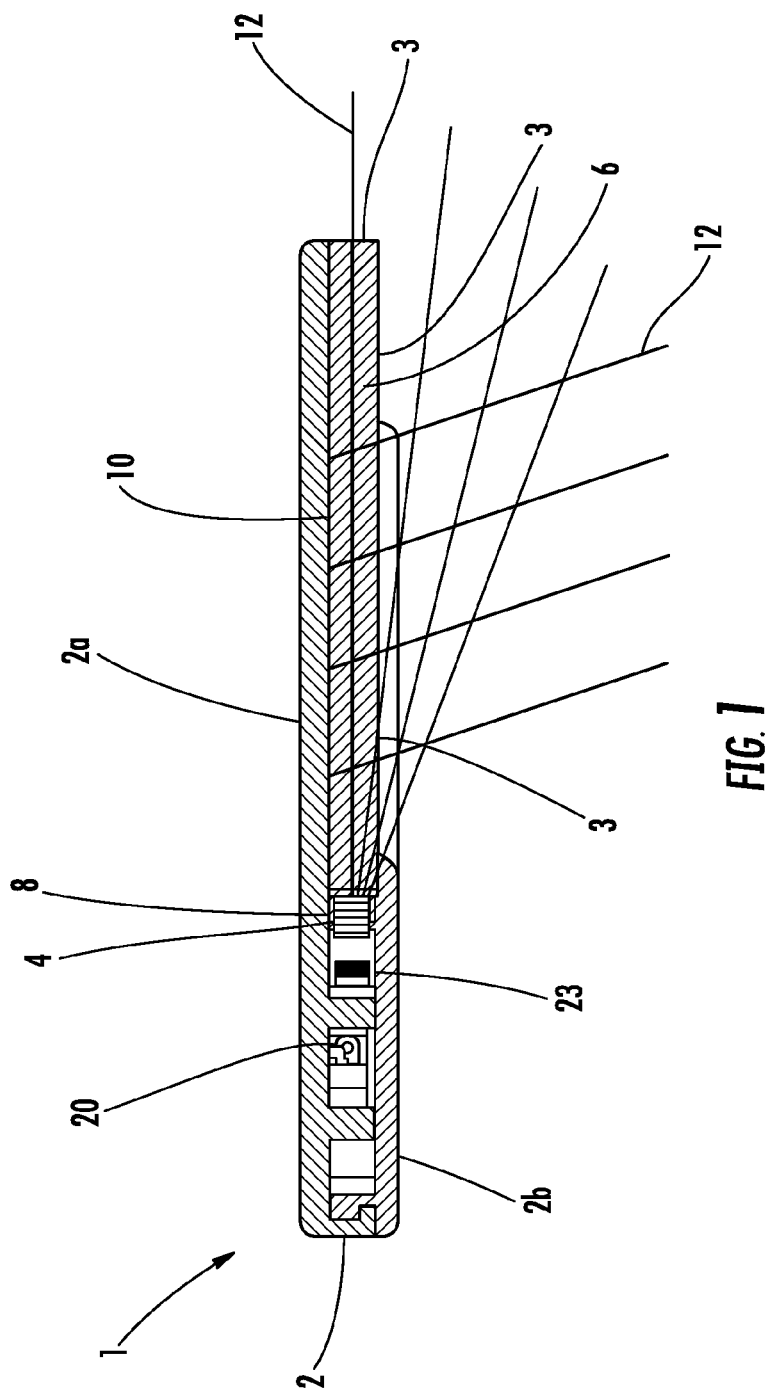
FIG. 1 shows a cross-sectional view of a light fitting according to an embodiment.

The following disclosure is intended to provide exemplary embodiments of the disclosed system and method, and these exemplary embodiments should not be interpreted as limiting. One of ordinary skill in the art will understand that the steps and methods disclosed may easily be reordered and manipulated into many configurations, provided they are not mutually exclusive. As used herein, "a" and "an" may refer to a single or plurality of items and should not be interpreted as exclusively singular unless explicitly stated.

Referring to FIGS. 1 to 8, an embodiment of the present invention comprises a light fitting 1 or other lighting arrangement. The light fitting 1 comprises a housing 2 including an upper housing portion 2a and a lower housing portion 2b. The housing in combination with one or more components of the light fitting (e.g. a light guide member) defines one or more apertures 3 through which light is to be emitted.

The housing 2 may be configured to enclose and/or retain one or more electrical lighting components. For example, the housing 2 may be configured to enclose an electrical transformer, and/or an electrical switch, and/or an electrical connection for coupling to an electrical supply.

The housing 2 is also configured to receive a light source 4. The light source 4 is configured to emit light for transmission through the, or each, aperture 3.

The light source 4 is configured for connection (see FIGS. 5 and 6) to an electrical supply (not shown). The electrical supply may include an external supply of electricity to the light fitting 1 and/or may include a battery which is located within the housing 2. The connection to the electrical supply may be via a plurality of wires, and/or one or more transformers, and/or one or more switches and/or one or more electrical connections (which may each be housed within the housing 2 or which may be external to the housing 2).

The light source 4 includes one or more light emitting diodes 8 (LEDs). The, or each, LED 8 is oriented such that a substantial part of the light emitted by the LED 8 is not delivered directly through the aperture 3. In particular, the, or each, LED 8 is configured such that a substantial part of the light emitted thereby passes through a predetermined location in the light fitting. In embodiments in which a plurality of LEDs 8 are provided, then the LEDs 8 may be configured such that a substantial part of the light emitted by the LEDs 8 passes through a predetermined location which is otherwise referred to as an intersection region—i.e. a region in which a substantial part of the light emitted by a first of the plurality of LEDs 8 intersects a substantial part of the light emitted by a second of the plurality of LEDs 8. In embodiments, a substantial part of the light of all of the LEDs 8 of the plurality of LEDs 8 intersects in the intersection region.

In embodiments, there are a plurality of intersection regions each of which is associated with a plurality of LEDs 8.

In embodiments, the, or each, LED 8 is mounted on a flexible circuit member 9. The flexible circuit member 9 includes conductors to couple the, or each, LED 8 to the electrical supply. In embodiments, a plurality of LEDs 8 are mounted on a single flexible circuit member 9. In embodiments, there is a plurality of flexible circuit members 9 and a plurality of LEDs 8 are mounted to each flexible circuit member 9. In embodiments, the plurality of flexible circuit members 9 are coupled to each other electrically and/or physically. In embodiments, the plurality of flexible circuit members 9 are daisy-chained together such that each flexible circuit member 9 is coupled to at least one other flexible circuit member 9.

In embodiments, there is a plurality of LEDs 8 which are arranged in modules. Each module may comprise a circuit board to which one or more LEDs 8 are connected. The circuit boards of the modules may be rigid or flexible. In embodiments, the modules are arranged such that the LEDs 8 thereof face inwardly towards a predetermined location.

The, or each, LED 8 may be provided in a surface mount technology package or through-hole package.

In embodiments, the, or each, flexible circuit member 9 includes a protective resistor for each LED 8 mounted thereon.

In embodiments, the flexible circuit member 9 is part of a longer flexible circuit member 9—a strip of flexible circuit member material. The strip of flexible circuit member material comprises a plurality of modules. Each module includes one or more LEDs 8. Electrical contacts may be provided on each module to allow each module to be connected to the electrical supply. The modules may be electrically coupled to each other by one or more electrical conductors. The strip of flexible circuit member material may be configured to be cut or split between each module. Thus, a strip of flexible circuit member material may be manufactured and then cut to size (i.e. into modules) for the desired application.

The, or each, LED 8 may be configured to emit light of the same frequency (or frequencies). In embodiments, a plurality of LEDs 8 are provided and the LEDs 8 are configured to emit light of at least two different colors in the visual spectrum—with each LED 8 emitting one color of light in the visual spectrum.

The light fitting further comprises a light guide member 6 (e.g. a light guide board, a light guide plate or a light guide panel). The light guide member 6 is configured to be mounted to and/or within the housing 2 and the housing 2 is configured to receive at least part of the light guide member 6.

The light guide member 6, when received by the housing, is located within the path of the substantial part of the light emitted by the, or each, LED 8. The light guide member 6 is configured to reflect a substantial part of the light incident on the surface of the light guide member 6 towards the, or each, aperture 3. In some embodiments, the light guide member 6 comprises the, or each, aperture 3.

The light guide member 6 may also be configured such that the reflected light diverges to a greater extent than the light which is incident on the light guide member 6. In other words, the light guide member 6 may be configured to spread the light out.

In embodiments, the or each LED 8 emits light into a cavity of the housing 2 towards the light guide member 6 which is, in some embodiments, housed within the cavity. In other words, the light from the, or each, LED 8 passes substantially directly to the light guide member ("directly" meaning without passing through an intermediate component). The, or each, LED 8 may include a lens.

The light guide member 6 may be located at the intersection region.

In embodiments, the light emitted by the light source 4 passes through the, or each, aperture 3 via the light guide member 6 before illuminating an object to be illuminated.

The light fitting 1 may be a modular-type light fitting—as shown in FIGS. 1 to 8.

The light fitting may comprise a housing 2 comprising upper 2a and lower 2b housing portions. The lower housing portion 2b or another part of the housing 2 is configured to receive a light source 4 and at least part of a light guide member 6.

In the embodiment depicted in FIGS. 1 to 8, the light source 4 comprises a flexible circuit member 9 having a degree of curvature. The flexible circuit member 9 carries a plurality of LEDs 8 which are arranged to face inwardly such that a substantial part of the light emitted by the LEDs 8 is directed radially inwardly with respect to the flexible circuit member 9. It will be understood that other embodiments may include a rigid circuit member or rigid circuit members (such as circuit boards) as discussed above.

Figure 3:
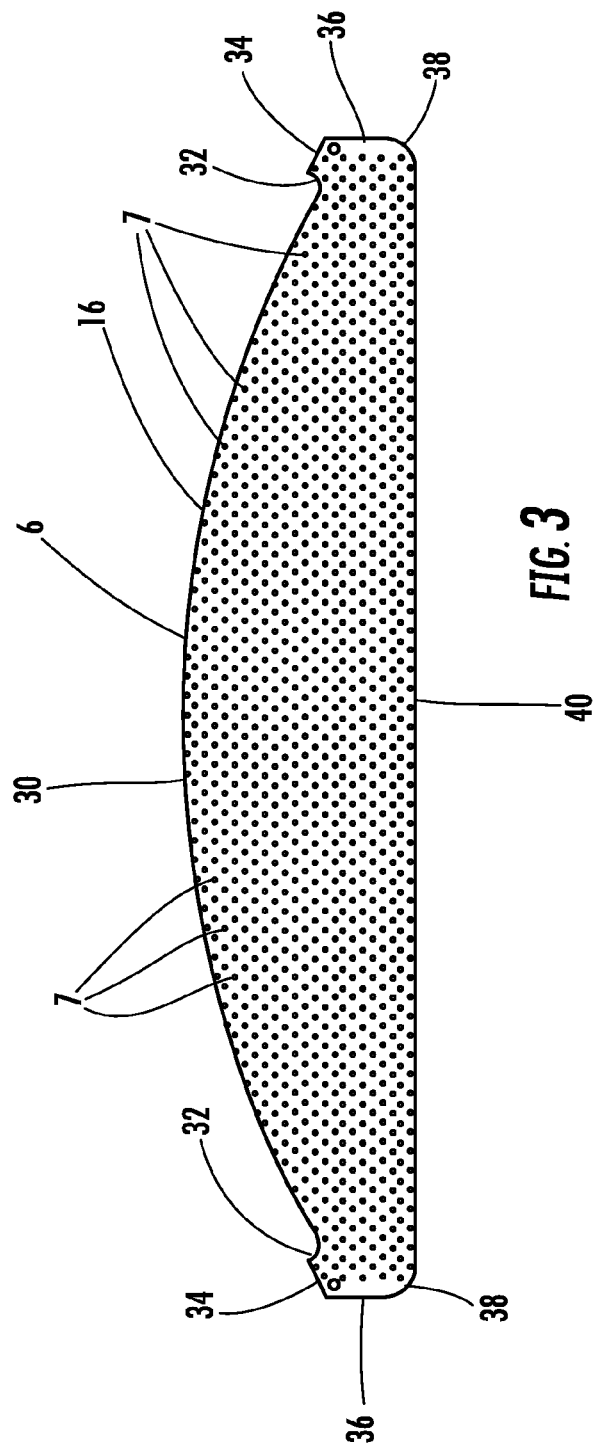
FIG. 3 shows an external view of a light guide member of a light fitting according to an embodiment.

The light guide board 6 in the embodiment depicted in FIG. 3 comprises a board or panel of material comprising a reflective pattern on at least one surface which is reflective to light in the visual spectrum. The light guide board 6 includes an outwardly extending central curved section 30. A peripheral portion of the light guide board 6 extends from the outwardly extending central curved portion 30. The peripheral portion comprises an inclined portion 32 extending from the peripheral of the outwardly extending central curved portion 32, a shallow declined portion 34 extending from the inclined portion 32, a more deeply declined portion 36 extending from the shallow declined portion 34, a declined curved portion 38 extending from the more deeply declined portion and a substantially flat portion 40 extending from the declined curved portion 38.

The light guide board 6 may be positioned such that the light emitted by the LEDs 8 is incident on the outwardly extending central curved portion of the light guide board 6 and the reflective pattern. In some embodiments, the outwardly extending central curved portion of the light guide board 6 is configured for abutment with a part of a light source. In particular, the outwardly extending curved portion is configured for abutment with the, or each, LED 8.

In some embodiments, the outwardly extending central curved portion of the light guide board 6 is configured to be coupled to a part of the light source.

In some embodiments, the outwardly extending central curved portion of the light guide board 6 is arranged in a housing 2 of the light fitting to lie adjacent to a part of the light source.

In embodiments, the light guide member 6 includes a computer generated or designed dot matrix reflective pattern 7 on one or more of its surfaces. The light guide member 6 is shaped along one edge (a curved edge portion) in order to gather all usable light rays emitted from the LEDs 8, to disperse the gathered light over a given area and to provide even distribution of the light emitted from the LEDs 8. The curved edge portion of the light guide member 6 may be one of a convex shaped edge portion, a crescent shaped edge portion, a domed shaped edge portion, an arc shaped edge portion, a segment of a circle and a partially ringed shaped edge portion.

In situations where the light fitting is intended to be installed in an area where space is at a premium or where the light fitting would be unsightly, such as, under a cabinet or under a shelf, it is desirable to minimize the bulk of the light fitting. With this in mind, a significant attribute of the light fitting of the present invention is the slim profile of the light fitting. The location of the LEDs 8 with respect to the light guide board 6 is key to achieving the slim profile. The, or each, LED 8 is mounted on or located adjacent to the curved edge portion of the light guide member, rather than behind as in conventional light fittings, which significantly reduces the thickness of the light fitting.

In some embodiments, the LEDs 8 are arranged in a complementary curved manner with respect to the curved edge portion of the light guide member 6. This arrangement ensures that the light emitted from the LEDs 8 is focused into the center of the light guide board 6. In other words, this arrangement of the LEDs 8 with respect to light guide member 6 helps to pool the light emitted from the LEDs 8 into the center of the light guide member 6 and the light guide member 6 in turn pools the light on to a target object (e.g. work surface) to be illuminated. The light guide member 6 may comprise an edge portion 16 which is configured to conform substantially with a part of the light source 4. For example, the edge portion 16 may have a degree of curvature which corresponds with a degree of curvature of a circuit member (such as the flexible circuit member 9) of the light source 4. In embodiments, the degree of curvature of the edge portion 16 dictates the degree of curvature of the flexible circuit member 9. In embodiments, the form (such as the degree of curvature) of the edge portion 16 corresponds with the form of an inwardly extending curved surface of the lower housing portion 2b and the outwardly extending curved portion of the light guide board 6 is configured to abut at least part of the inwardly extending curved surface of the lower housing portion 2b.

In some embodiments, a uniform distribution/density of reflective dots 7 on the light guide board 6 ensures a bright and even distribution of light across the entire light guide board 6; thereby avoiding bright edges and a dark center in the light fitting (which is known to occur in conventional light fittings).

In embodiments, a reflector 10 is provided. The reflector 10 is configured to be mounted to and/or within the housing 2 and the housing 2 is configured to receive at least part of the reflector 10.

The reflector 10, when received by the housing, is located outside of the path of the substantial part of the light emitted by the, or each, LED 8. The reflector 10 is configured to reflect a substantial part of the light incident on the surface of the reflector 10 towards the, or each, aperture 3.

The reflector 10 may also be configured such that the reflected light diverges to a greater extent than the light which is incident on the reflector 10. In other words, the reflector 10 may be configured to spread the light out.

In some embodiments, the light guide board 6 is configured by lasering dots 7 into a piece of plastic (e.g. Poly (methyl methacrylate) (PMMA) or acrylic). In use, as the light from the LEDs 8 is directed through the plastic, the dots by refraction push the light downwards (e.g. with respect to FIGS. 1, 2 and 4 to 8) out of the material. Without the precision-engineered lasered dots (see FIG. 3), the plastic would light up but the majority of the light (e.g. light rays 12) would move through the material and out the opposite edge. As can be seen in FIG. 1, in some embodiments, any light (e.g. light rays 12) that is refracted upwards hits a reflective layer 10 that sends the light (light rays 12) downwards.

One or more heat sink members 23 are provided according to some embodiments disclosed herein. The, or each, heat sink member 23 is configured to distribute heat generated by the light source 4 away from the light source 4. Accordingly, the, or each, heat sink member 23 may be configured to conduct heat away from the light source 4.

The, or each, heat sink member 23 is configured to be positioned such that the heat sink member is coupled in thermal communication with the light source 4 such that heat produced thereby can be conducted away from the light source 4.

In embodiments, the, or each, heat sink member 23 is positioned outside of the path of light from the light source 4 to the light guide member 6. The heat sink may be made of aluminum.

A plurality of screws, washers, nuts, and bolts may be provided to couple the various components of the light fitting 1 together.

As will be appreciated, the arrangement of the light source 4 and light guide member 6 according to the embodiment described with reference to FIGS. 1 to 8 form an edge-lit lighting arrangement.

Accordingly, a light fitting 1 may be a spotlight, for example. The light fitting may include a light source 4 which is configured with respect to one or more other components of the light fitting 1 (and, in particular, to a light guide member 6 of the light fitting 1) such that a substantial part of the light emitted by the light source 4 is reflected by a light guide member 6 before leaving the light fitting 1. The light guide board 6 and light source 4 arrangement may be substantially as described above—with the light source 4 emitting light radially towards the light guide board 6.

References to a substantial part of the light emitted by an LED, as made herein, are references to the majority of the light emitted by the LED (in other words, the major part of the light). In this instance an LED is an example of a light source 4 or part thereof.

The flexible circuit member may be sufficiently flexible to conform to a curved surface. The flexible circuit member may be more flexible than a conventional printed circuit board. The flexible circuit member may be sufficiently flexible such that the member may form a part of a loop within a domestic or commercial light fitting 1.

Figure 2:
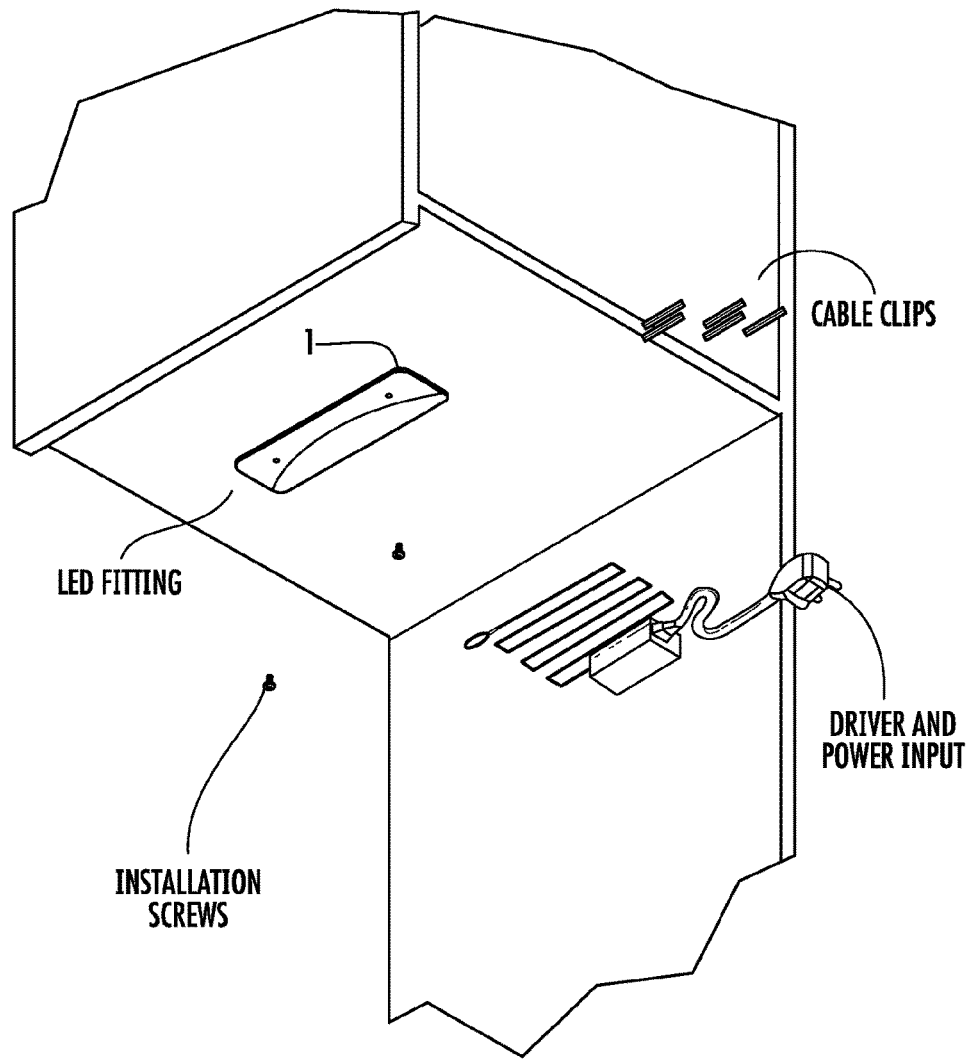
FIG. 2 shows an external view of a light fitting according to an embodiment when installed in an example location.
Figure 4:
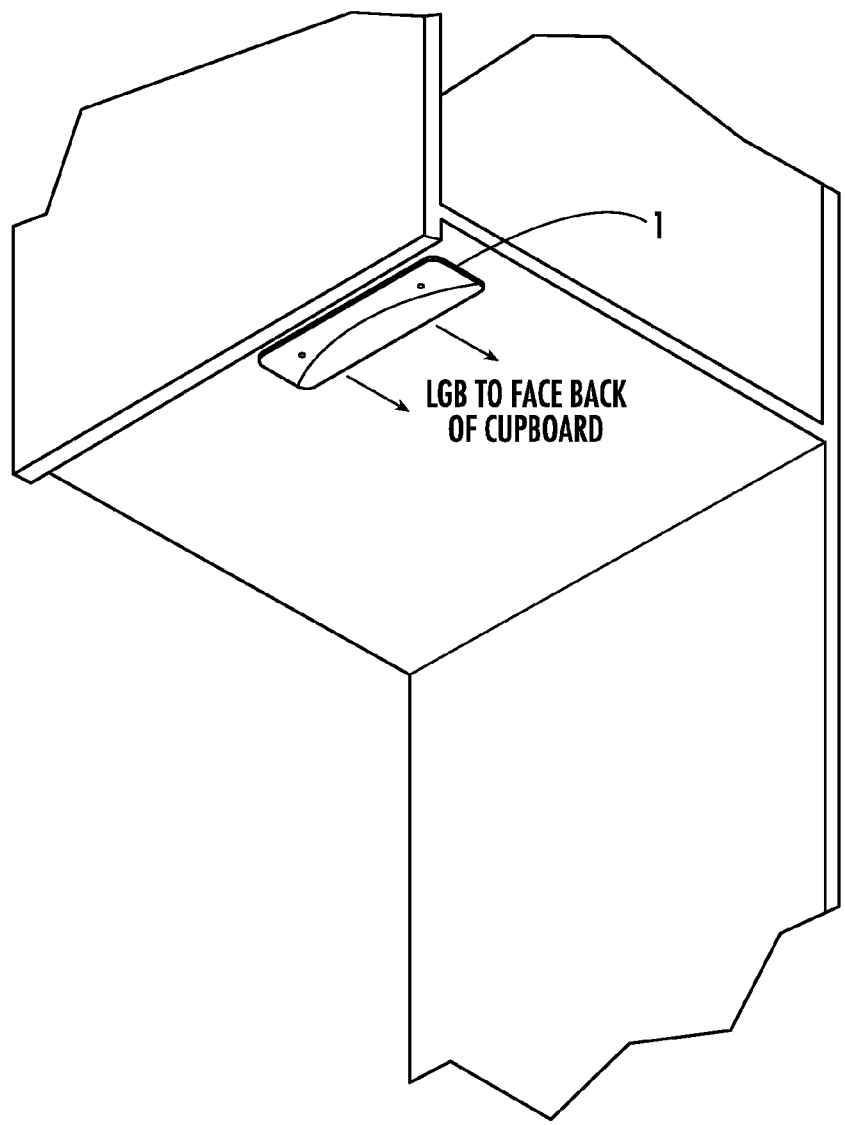
FIG. 4 shows an external view of a light fitting according to an embodiment when installed in an example location.
Figure 5:
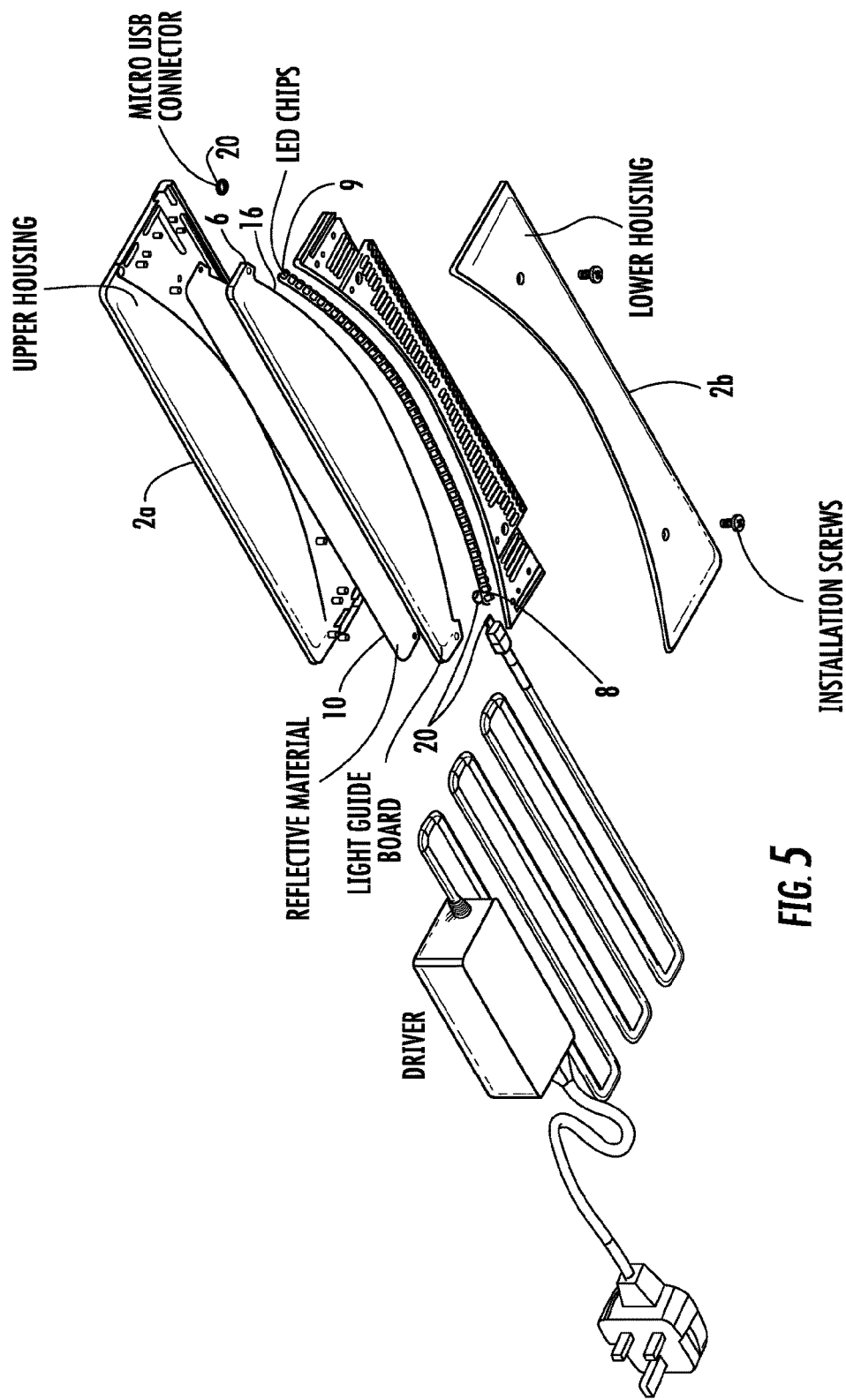
FIG. 5 shows an exploded view of a light fitting according to an embodiment.
Figure 6:
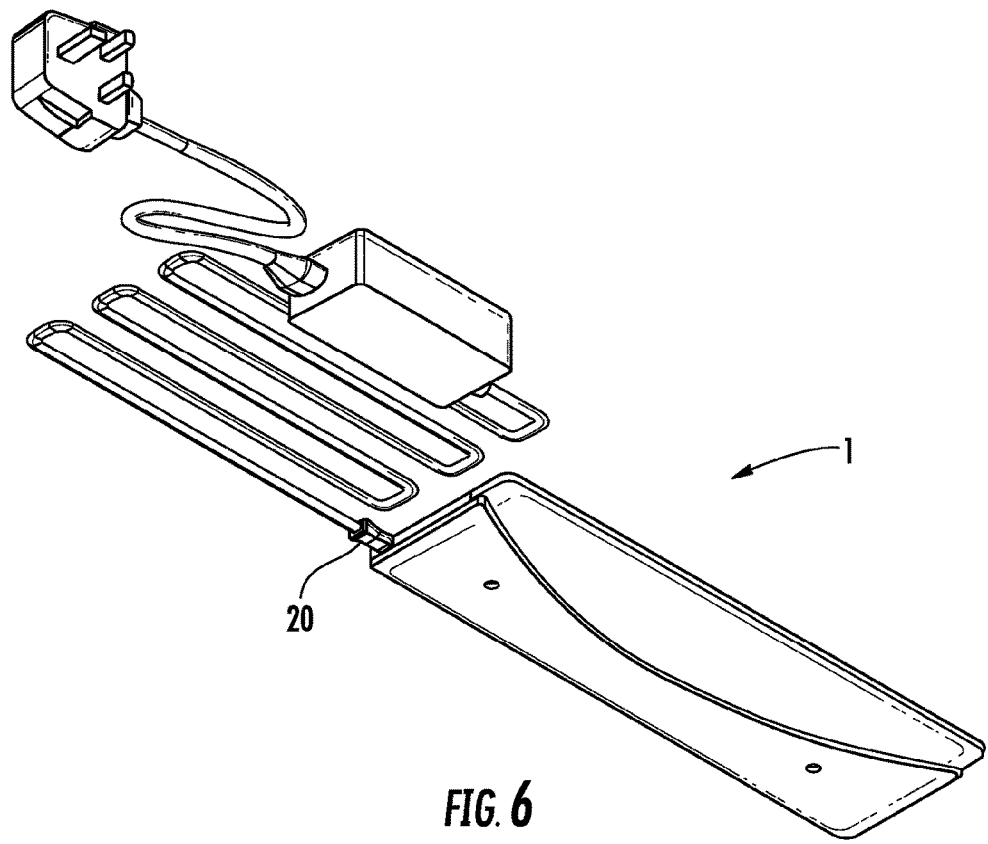
FIG. 6 shows an external view of a light fitting according to an embodiment.
Figure 7:
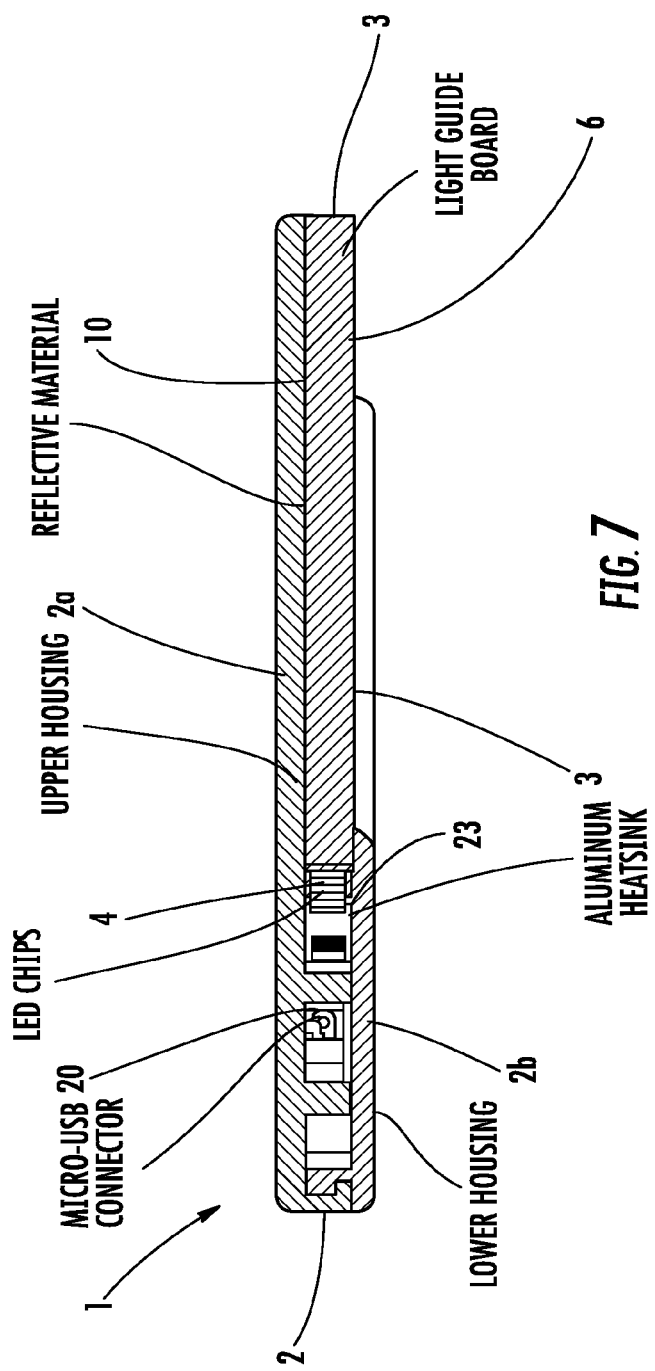
FIG. 7 shows a cross-sectional view of a light fitting according to an embodiment.
Figure 8:
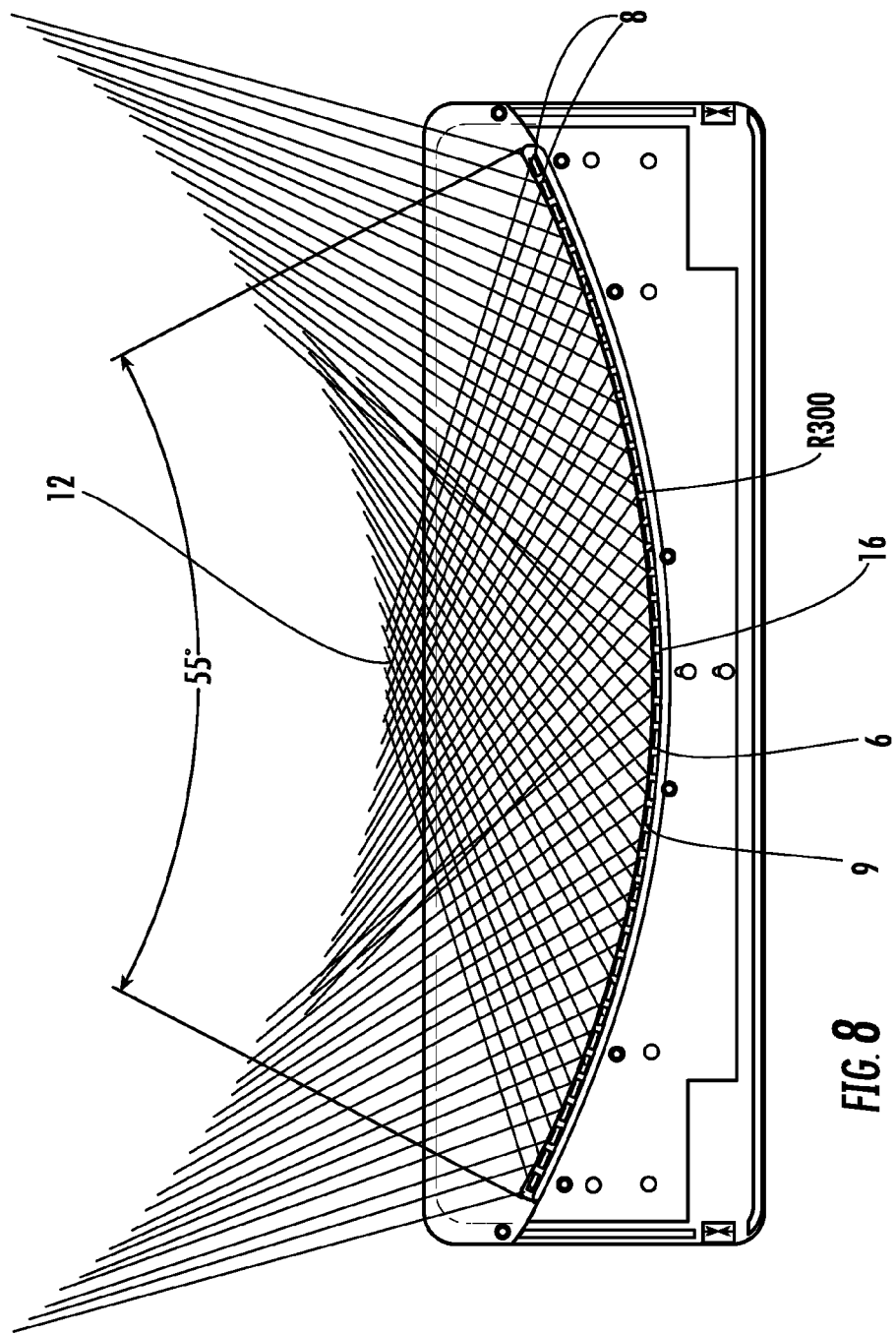
FIG. 8 shows an external view of a light fitting according to an embodiment.
Figure 9:
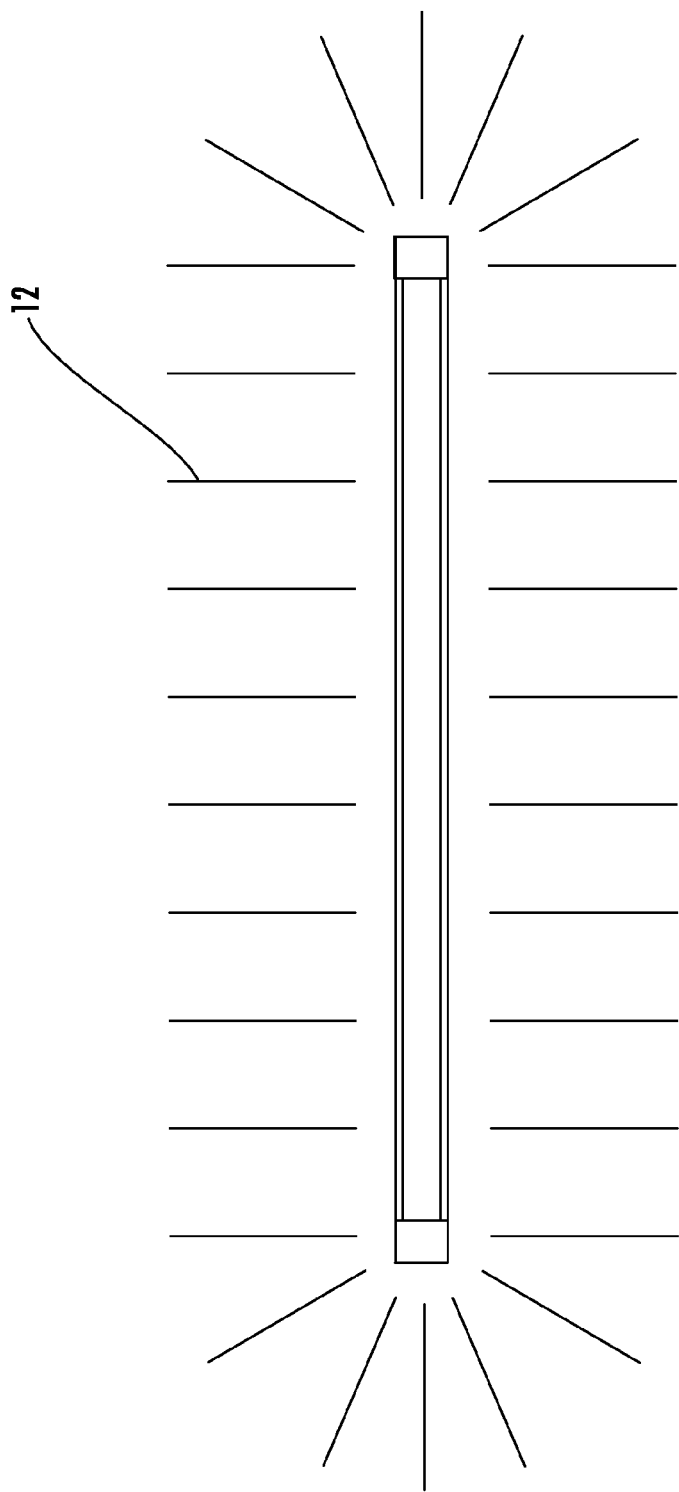
FIG. 9 shows an external view of a conventional light fitting.

Referring to FIGS. 2 and 4, in use, the light fitting 1 may be placed on the underside of a cabinet. Positioning the light fitting 1 with the exposed edge facing inwards will provide light across the work surface, and not wasted into the room. Advantageously, by positioning the light fitting 1 towards the front of the cabinet will ensure that the very front edge of the work surface is sufficiently illuminated. The light fitting 1 can be installed by first marking out the screw points by positioning the light fitting in a desired location, thereafter a number of holes can be drilled to receive the mounting screws. The connecting cables are secured to the surface using adhesive-backed plastic clips. Typically the input cable with the driver and plug is fed through the cabinet to a power supply or wall socket.

In an example configuration, a uniform spread of reflective dots on the light guide member will ensure an even light output with an efficient LOR (Light Output Ratio).

In some embodiments, it should be noted that by creating a substantially concave shape in the LED strip, the spread of light can be restricted (controlled) to the desired illumination area. Otherwise the light would be emitted without any control.

Conventional under cabinet lighting is generally non directional allowing the light emitted to illuminate areas not requiring illumination. In some embodiments, the light fitting 1 is able to focus the light from the LEDs 8 onto a work surface and a back wall in a pattern that ensures that a minimum spread and light level is achieved (see FIGS. 2 and 4). In one embodiment, the light fitting 1 is designed to illuminate a minimum of 500 millimeters (mm) on a work surface. In another embodiment, the light fitting one is designed to illuminate a minimum of 1000 mm on a work surface. This is achieved by the LGB design and curve of the LED strip.

In some embodiments, the light fitting 1 is less than 8 mm in thickness.

In some embodiments, the light guide member can emit 20% usable light out of the three open faces (see FIGS. 1 to 8) allowing for 80% to be converted into downward light.

In some embodiments, the LED module and light guide board have been radiused to capture and control the light emitted from the LED module enabling minimal spacing whilst providing increased cooling for the LEDs.

In some embodiments, to maintain the slim dimensions, the light fitting 1 utilizes standardized micro USB (universal serial bus) connections 20.

In some embodiments, the light fitting 1 comprises a highly reflective membrane 10 which is placed behind the light guide board 6 to provide high LOR (Light output ratio) maximizing efficiency.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A light fitting comprising:
    an aperture;
    a light guide member comprising a curved edge portion and a reflective pattern;
    a light source including one or more light emitting diodes arranged with respect to the aperture and the curved edge portion of the light guide member such that a substantial part of the light emitted by the one or more light emitting diodes passes indirectly through the aperture by reflecting from the reflective pattern of the light guide member through the aperture.

2. The light fitting according to claim 1, wherein the light source includes a plurality of light emitting diodes arranged in a complementary curved manner with respect to the curved edge portion of the light guide member.

3. The light fitting according to claim 1, wherein the light source includes a plurality of light emitting diodes which are configured such that the substantial part of the light emitted by the diodes intersects in a first predetermined region.

4. The light fitting according to claim 3, wherein the light guide member is located in the first predetermined region.

5. The light fitting according to claim 2, wherein the plurality of light emitting diodes are configured such that the substantial part of the light emitted by the diodes focuses into a center of the light guide member.

6. The light fitting according to claim 3, wherein the light guide member and the plurality of light emitting diodes are arranged such that the substantial part of the light emitted by the diodes converges to a second predetermined region through the aperture after reflecting from the reflective pattern of the light guide member.

7. The light fitting according to claim 6, wherein the reflective pattern comprises a dot matrix reflective pattern for gathering, guiding and dispersing the substantial part of the light emitted by the plurality of the light emitting diodes to the second predetermined region through the aperture.

8. The light fitting according to claim 1, wherein the reflective pattern is configured to redirect by refraction the light from the one or more light emitting diodes through the aperture.

9. The light fitting according to claim 1, wherein the curved edge portion of the light guide member is one of a convex shaped edge portion, a crescent shaped edge portion, a domed shaped edge portion, an arc shaped edge portion, and a partially ringed shaped edge portion.

10. The light fitting according to claim 9, wherein the light source including the one or more light emitting diodes is arranged in a complementary shaped arrangement with respect to the curved portion of the light guide member.

11. The light fitting according to claim 1, wherein the light source includes a plurality of light emitting diodes mounted on a flexible circuit board member.

12. The light fitting according to claim 1, further comprising a reflector arranged with respect to the light guide member for reflecting light received via the light guide member.

13. The light fitting according to claim 1, wherein one or more light emitting diodes comprises a partial ring of light emitting diodes and the light guide member is located adjacent to the partial ring of light emitting diodes.

14. The light fitting according to claim 13, wherein the light emitting diodes define an illumination plane along which the substantial part of the light emitted by the light emitting diodes passes, and wherein the light guide member intersects the illumination plane.

15. The light fitting according to claim 1, further comprising a heat sink member coupled in thermal communication with the light source.

16. The light fitting according to claim 15, wherein the heat sink member is positioned remote from the light guide member with respect to the light source.

17. The light fitting according to claim 1, wherein the light source is configured for connection to an electrical supply via a micro universal serial bus connection.

18. The light fitting according to claim 1, wherein the light fitting is an under-shelf or under-cabinet light fitting.

19. The light fitting according to claim 3, wherein the plurality of light emitting diodes are configured such that the substantial part of the light emitted by the diodes focuses into a center of the light guide member.

20. The light fitting according to claim 4, wherein the plurality of light emitting diodes are configured such that the substantial part of the light emitted by the diodes focuses into a center of the light guide member.

* * * * *